(12) United States Patent
Guntaka et al.

(10) Patent No.: US 10,338,374 B1
(45) Date of Patent: Jul. 2, 2019

(54) ELECTROWETTING DISPLAY DEVICE WITH DUAL FUNCTION DIFFUSER

(71) Applicant: AMAZON TECHNOLOGIES, INC., Seattle, WA (US)

(72) Inventors: Tulasi Sridhar Reddy Guntaka, Eindhoven (NL); Karel Johannes Gerhardus Hinnen, Eindhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 124 days.

(21) Appl. No.: 15/195,693

(22) Filed: Jun. 28, 2016

(51) Int. Cl.
*G02B 26/00* (2006.01)
*G02F 1/29* (2006.01)
*G02B 26/08* (2006.01)
*G02B 5/02* (2006.01)
*G02B 5/00* (2006.01)
*G02B 5/22* (2006.01)

(52) U.S. Cl.
CPC ........... *G02B 26/005* (2013.01); *G02B 5/003* (2013.01); *G02B 5/0263* (2013.01); *G02B 5/22* (2013.01)

(58) Field of Classification Search
CPC .... G02B 26/005; G02B 26/004; G02B 5/003; G02B 5/201; G02B 5/02; G02B 26/023; G02B 2207/115; G02B 26/04; G02B 27/2214; G02B 5/3058; G02B 26/007; G02B 26/08; G02B 27/4233; G02B 5/0236; G02B 5/0278; G02B 6/0026; G02B 6/0068; G02B 6/0073
USPC ........ 359/237, 242, 265–267, 273, 290–292, 359/295, 296, 298
See application file for complete search history.

(56) References Cited

U.S. PATENT DOCUMENTS

| | | |
|---|---|---|
| 2009/0246509 A1 | 10/2009 | Murayama et al. |
| 2014/0340752 A1 | 11/2014 | Kusama et al. |
| 2014/0340753 A1 | 11/2014 | Kusama et al. |
| 2015/0212540 A1* | 7/2015 | Tsujimoto ........... G02F 1/13338 345/174 |
| 2015/0355390 A1 | 12/2015 | Katagiri et al. |
| 2016/0025907 A1 | 1/2016 | Kusama et al. |
| 2016/0018571 A1 | 2/2016 | Kusama et al. |
| 2016/0033692 A1 | 2/2016 | Kusama et al. |
| 2016/0047952 A1 | 2/2016 | Kusama et al. |

* cited by examiner

*Primary Examiner* — Brandi N Thomas
(74) *Attorney, Agent, or Firm* — EIP US LLP

(57) ABSTRACT

A display device includes a first support plate and an opposing second support plate. A pixel region is between the first support plate and an inner surface of the second support plate. A diffuser is disposed on the second support plate. The diffuser has a first diffusion area over the pixel region. The first diffusion area has a first region with a first diffusion profile and a second region with a second diffusion profile.

15 Claims, 6 Drawing Sheets

ELECTROWETTING DISPLAY DEVICE WITH DUAL FUNCTION DIFFUSER

BACKGROUND

Electronic displays are found in numerous types of electronic devices including, without limitation, electronic book ("eBook") readers, mobile phones, laptop computers, desktop computers, televisions, appliances, automotive electronics, and augmented reality devices. Electronic displays may present various types of information, such as user interfaces, device operational status, digital content items, and the like, depending on the type and the purpose of the associated electronic device. The appearance and the quality of a display may affect a user's experience with the electronic device and the content presented thereon. Accordingly, enhancing user experience and satisfaction continues to be a priority.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1:
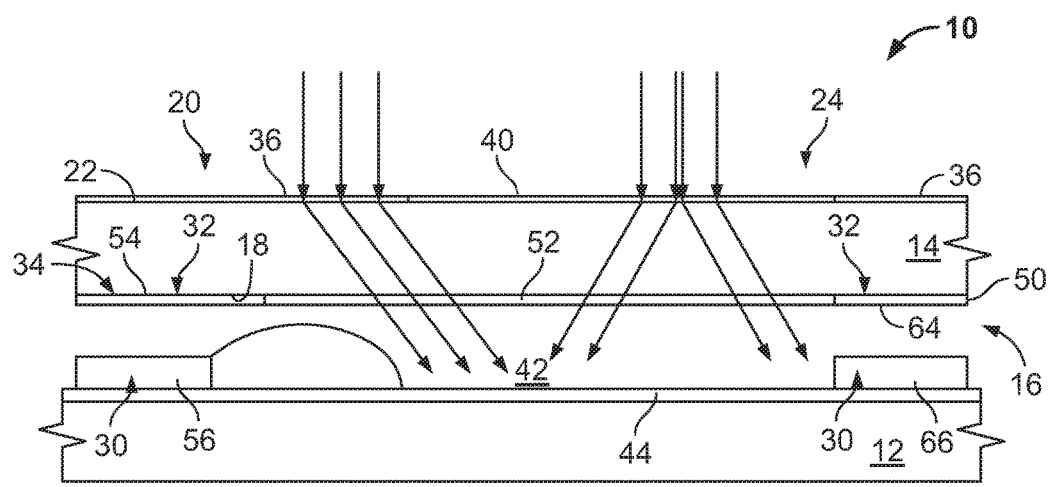
FIG. 1 is a cross-sectional view of a portion of an example electrowetting display device, according to various embodiments.

In embodiments described herein, an electrowetting display device includes a diffuser disposed on a top surface of a top support plate of the electrowetting display device. In example embodiments, the diffuser has a periodic, e.g., repeating, spatially varying diffusion profile. More specifically, the diffuser includes a material structure, e.g., one or more material layers, including a plurality of diffusion areas arranged in an array (including a plurality of rows and a plurality of columns of diffusion areas). Each diffusion area of the diffuser is aligned or positioned over a corresponding pixel region and has a diffusion profile that varies dependent on a point or a location within the diffusion area. For example, at a center point of the diffusion area, the diffuser has a diffusion profile that generates a conical diffusion pattern of diffuse light. At a point or a location near or at a perimeter of the diffusion area, the diffuser has a different diffusion profile that generates a collimated diffusion pattern of light, steering light away from an underlying black matrix and towards an active portion or a reflective surface of the corresponding electrowetting pixel region. As mentioned above, the example spatially varying diffusion profile is periodic, and the diffusion profile within each diffusion area of the diffuser over a respective pixel region in the display is identical or substantially similar to adjacent diffusion areas of the diffuser positioned over respective adjacent pixel regions.

In contrast, in many conventional reflective electrowetting displays, a diffusion layer is disposed on a top surface of the top support plate of the display to enhance a viewing angle performance. These conventional diffusion layers exhibit a substantially uniform diffusion profile across a surface of the diffusion layer, i.e., the diffusion layer has a substantially similar diffusion profile at any point or any location on the diffusion layer. Further, with conventional diffusion layers, light is transmitted through the diffusion layer and at least some of the light impinges on and is absorbed by a black matrix material of a color filter disposed under the diffusion layer. As a result, the diffused light impinging on and absorbed by the black matrix material does not contribute to the optical performance of the display.

In example embodiments, the electrowetting display device includes a filter layer disposed on an inner surface of the top support plate, opposite the outer surface. The filter layer includes a grid of black matrix material having a plurality of black matrix members forming or defining a plurality of voids in which a color filter portion, e.g., a red, green, blue or transparent (white) color filter portion, is disposed. Within each diffusion area of the diffuser disposed on the outer surface of the top support plate, a first region is aligned or positioned over corresponding black matrix members. A second region within the diffusion area is disposed above a corresponding color filter portion. The first region is configured to direct or steer light away from the corresponding black matrix members and into an active portion or region of the electrowetting pixel region through the color filter portion. The second region is configured to diffuse light having a desired diffusion pattern as the light exits the second region and enters the active region of the electrowetting pixel region. Generally, the active region of the pixel region includes a reflective layer configured to reflect light when the pixel region is activated.

In one example embodiment, the diffuser exhibits a spatially varying diffusion profile described by a periodic function, as follows:

$$f(x,y)=f(x-np_x, y-mp_y), \text{ with } \{n,m\} \in \mathbb{Z}, \quad \text{(Eq. 1)}$$

wherein n and m are integers that describe a periodicity of structures, e.g., repeating diffusion areas of the diffuser, defined by $(p_x, p_y)$, and wherein $p_x$ is a spatial location from a reference location, e.g., a reference point aligned with a point on a pixel wall portion, on a surface of the diffuser in an x-direction (corresponding to a spatial location in an x-direction on a pixel or sub-pixel positioned or aligned under the respective diffusion area) and $p_y$ is a spatial location from the reference location on the surface of the diffuser in a y-direction (corresponding to a spatial location in a y-direction on the pixel or sub-pixel positioned or aligned under the respective diffusion area). For example, in one embodiment, the pixel or sub-pixel is 120 micrometers× 60 micrometers. In this embodiment, $p_x$ is equal to 120 micrometers corresponding to a dimension of the underlying pixel or sub-pixel in the x-direction and $p_y$ is equal to 60 micrometers corresponding to a dimension of the underlying pixel or sub-pixel in the y-direction. Due to the spatially varying diffusion profile, the example diffuser as described herein enhances display brightness, contrast, and viewing angle performance.

Figure 2:
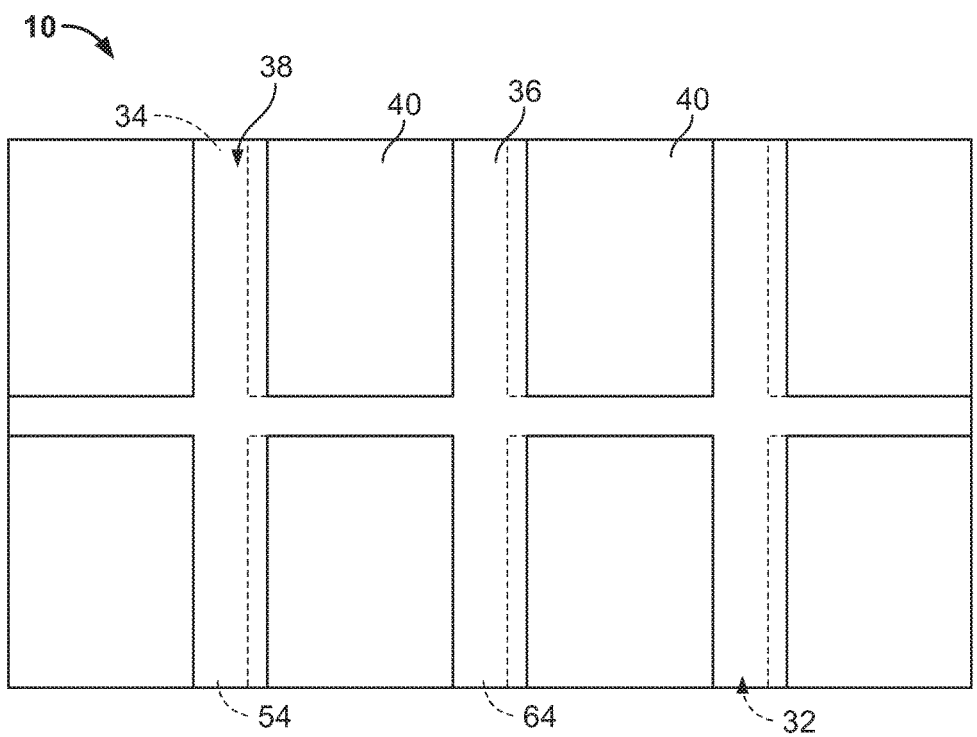
FIG. 2 is a top view of a portion of an example diffuser for an electrowetting display device, according to various embodiments.

Referring to the figures, and initially, to FIGS. 1 and 2, an example display device, such as an electrowetting display device 10. FIG. 1 is a cross-sectional view of a portion of example electrowetting display device 10 and FIG. 2 is a top view of a portion of an example diffuser for an electrowetting display device. Electrowetting display device 10 includes a first or bottom support plate 12 and an opposing second or top support plate 14. A pixel region 16, for example, an electrowetting pixel region, is positioned or formed between first support plate 12 and an inner surface 18 of second support plate 14. In example embodiments, a diffuser 20 is disposed on second support plate 14. For example, as shown in FIGS. 1 and 2, diffuser 20 is disposed on an outer surface 22 of second support plate 14 opposite inner surface 18. Diffuser 20 includes a material structure, e.g., one or more material layers, having a plurality of diffusion areas 24 defined on diffuser 20 and arranged in an array of diffusion areas, e.g., arranged in rows and columns. In an example embodiment, diffuser 20 includes one or more suitable film layers. A first diffusion area 24 of diffuser 20 is positioned over, e.g., aligned over, pixel region 16. In example embodiments, diffusion area 24 has a spatially varying diffusion profile as described above, i.e., diffusion area 24 has a diffusion profile that varies depending on a location within the diffusion area.

As shown in FIG. 1, a plurality of pixel wall portions 30 is formed or positioned over first support plate 12. The plurality of pixel wall portions 30 forms a perimeter of pixel region 16. A plurality of black matrix members 32 is disposed on inner surface 18 of second support plate 14, and positioned over, e.g., aligned over, the plurality of pixel wall portions 30. Black matrix members 32 form a portion of a black matrix grid 34 on inner surface 18. In example embodiments, diffusion area 24 includes a first region 36 positioned over, e.g., aligned over, the plurality of black matrix members 32 to form a grid 38 of first region portions, such as shown in FIG. 2, over black matrix grid 34. In example embodiments, first region 36 has a first diffusion profile. A second region 40 of diffusion area 24 is positioned over, e.g., aligned over, pixel region 16. As shown in FIG. 2, portions of first region 36 surround or form a perimeter of second region 40. Second region 40 has a second diffusion profile different than the first diffusion profile. In example embodiments, first region 36 is configured to direct light away from black matrix members 32 and into an active portion 42 of pixel region 16 and second region 40 is configured to diffuse light in a suitable conical diffusion pattern, for example, such that the diffused light enters active portion 42, shown in FIG. 1, for example.

A reflective layer 44 is positioned within active portion 42. In certain embodiments, reflective layer 44 is formed or made of any suitable material including, for example, a metal (90%, 95% or greater than 95% metal), an alloy, a doped metal, or a dielectric reflective material. Suitable metal materials for reflective layer 44 include, without limitation, aluminum, silver, gold, copper, nickel, platinum, rhodium, lanthanum, and/or silicon nickel. Suitable alloy materials for reflective layer 44 include, without limitation, aluminum with copper or aluminum with nickel. In further alternative embodiments, reflective layer 44 is made of any suitable material providing a desired specular reflectance. In alternative embodiments, reflective layer 44 includes a suitable diffuse reflective material. In this alternative embodiment, any suitable diffuse reflective material, such as titanium dioxide ($TiO_2$), providing a desired diffuse reflectance may be used. With the associated pixel in an active state, light can enter pixel region 16 and impinge upon a surface of reflective layer 44, for example, positioned at or near a bottom of pixel region 16. The light is then reflected by reflective layer 44 to reflect out of pixel region 16. If reflective layer 44 reflects only a portion of the light spectrum or if color filters are incorporated into the electrowetting pixel structure, pixel region 16 may appear to be gray or have color.

In example embodiments, a filter layer 50 including black matrix members 32 is disposed on second support plate 14. For example, as shown in FIGS. 1 and 2, filter layer 50 is disposed on an inner surface 18 of second support plate 14. In certain embodiments, diffuser 20 and filter layer 50 may be disposed on the same surface of second support plate 14, e.g., inner surface 18, or on opposite surfaces of second support plate 14, e.g., filter layer 50 is disposed on inner surface 18 and diffuser 20 is disposed on outer surface 22. Filter layer 50 includes a color filter portion, e.g., a red color filter portion 52 as shown in FIG. 1, a green color filter portion, a blue color filter portion, or a transparent (white) color filter portion disposed over or in pixel region 16, and a plurality of black matrix members 32 forming a perimeter of an associated color filter portion, such as red color filter portion 52. A first black matrix member 54 of the plurality of black matrix members 32 is positioned over, e.g., aligned over, a first pixel wall portion 56 of the plurality of pixel wall portions 30. First region 36 of diffusion area 24 is positioned over, e.g., aligned over, first black matrix member 54 and, in certain embodiments, extends over a portion of the associated color filter portion, such as red color filter portion 52 shown in FIG. 1, of pixel region 16.

A second black matrix member 64 of the plurality of black matrix members 32 is positioned over, e.g., aligned over, a second pixel wall portion 66 of the plurality of pixel wall portions 30. In this embodiment, first region 36 is positioned over second black matrix member 64. For example, as shown in FIG. 1, second black matrix member 64 is positioned opposite first black matrix member 54, i.e., positioned along an opposite edge of pixel region 16, and over second pixel wall portion 66 opposite first pixel wall portion 56. First region 36 is over second black matrix member 64 such that at least a portion of light exiting first region 36 enters active portion 42 of pixel region 16 through red color filter portion 52. In particular embodiments, a portion of light exiting first region 36 over second black matrix member 64 enters active portion 42 of pixel region 16 through red color filter portion 52 and a portion of light enters an active portion of an adjacent pixel region not shown in FIG. 1. Alternatively, substantially all of the light exiting first region 36 over second black matrix member 64 enters the active portion of the adjacent pixel region rather than pixel region 16.

Referring further to FIGS. 1 and 2, diffusion area 24 of diffuser 20 also includes second region 40 positioned over, e.g., aligned over, at least a portion of an associated color filter portion, for example, red color filter portion 52. In certain example embodiments, as described in greater detailed below, diffuser 20 includes a first material layer, such as suitable film layer, having a plurality of first region portions forming grid 38 and a second material layer, such as suitable film layer, laminated or otherwise coupled to the first material layer including a plurality of second regions aligned or positioned between respective first region portions.

In certain embodiments, a pixel region may include a pixel or a pixel having two or more sub-pixels of a display device. Such pixels or sub-pixels may be the smallest light transmissive, reflective or transflective unit of a display that is individually operable to directly control an amount of light transmission through or reflection from the pixel region. For example, in some embodiments, a pixel may include a red sub-pixel, a green sub-pixel, a blue sub-pixel, and a white sub-pixel for RGBW displays. In other embodiments, a pixel may be a smallest component, e.g., the pixel does not include any sub-pixels.

In various embodiments described herein, electronic devices include electrowetting displays for presenting content. In some examples, the electronic devices may include one or more components associated with the electrowetting display, such as a touch sensor component layered atop the electrowetting display for detecting touch inputs, a front light and/or a back light component for lighting the electrowetting display, and/or a cover layer component, which may include anti-glare properties, anti-reflective properties, anti-fingerprint properties, and/or anti-cracking properties, for example.

In certain embodiments, an electrowetting pixel region includes an electrowetting pixel defined by one or more pixel walls that surround or are otherwise associated with at least a portion of the electrowetting pixel. The pixel wall portions form a structure that is configured to contain at least a portion of a first fluid, e.g., a liquid such as an opaque oil. Light transmission through the electrowetting pixel is controlled by the application of an electric potential to the electrowetting pixel, which results in a movement of a second fluid, e.g., a liquid such as an electrolyte solution, into the electrowetting pixel, thereby displacing the first fluid within the electrowetting pixel.

When the electrowetting pixel is in an off state (i.e., with no electric potential applied), the first liquid, e.g., the opaque oil, is distributed throughout the electrowetting pixel to substantially cover a display surface area of the electrowetting pixel. The first liquid absorbs light and the electrowetting pixel in this condition appears dark, e.g., black, in one embodiment. But when the electric potential is applied, the electrowetting pixel is in an on state and the first liquid is displaced to one or more sides of the electrowetting pixel, for example. Light can then enter the electrowetting pixel and impinge upon a surface of a reflective layer, for example, positioned at or near a bottom surface of the electrowetting pixel. The light is then reflected by the reflective layer to reflect out of the electrowetting pixel. If the reflective surfaces reflect only a portion of the light spectrum or if color filters are incorporated into the electrowetting pixel structure, the electrowetting pixel may appear to have color.

A display device, such as an electrowetting display device, may include a transmissive, reflective or transflective display that generally includes an array of pixels (e.g., which may comprise sub-pixels) configured to be operated by an active matrix addressing scheme. For example, rows and columns of electrowetting pixels are operated by controlling voltage levels on a plurality of source lines and gate lines. In this fashion, the display device may produce an image by selecting particular pixels to transmit, reflect or block light. Pixels are addressed (e.g., selected) via rows and columns of the source lines and the gate lines that are electrically connected to transistors (e.g., used as switches), which may be included in each pixel region. In certain embodiments, transistors occupy a relatively small fraction of the area of each pixel region to allow light to efficiently pass through (or reflect from) the pixel region.

The array of pixel regions is sandwiched between two support plates, such as a first, e.g., bottom, support plate and an opposing second, e.g., top, support plate. For example, a bottom support plate in cooperation with a top support plate may contain pixel regions that include an oil, an electrolyte solution and pixel walls between the support plates at least partially forming associated pixels within a respective pixel region. The support plates may be made of any suitable material including, without limitation, plastic, glass, quartz, and semiconducting materials, and may be made of a rigid material or a flexible material, for example. The pixel regions include various layers of materials built upon the bottom support plate, e.g., within or under the pixels. One example layer is an amorphous fluoropolymer (AF1600®) with hydrophobic behavior. The pixel walls may be formed on a top surface of the hydrophobic layer. The bottom support plate may be opaque while the top support plate is transparent. Describing a component or material as being "transparent" generally means that the component or the material may transmit a relatively large fraction of the light incident upon it. For example, a transparent material or layer might transmit more than 70% or 80% of the light impinging on its surface, although in other examples a transparent material or structure might transmit a different percentage of incident light. In general, transparent materials or structures need not be perfectly transparent.

Hereinafter, example embodiments include, but are not limited to, reflective electrowetting displays having a clear or transparent top support plate and a bottom support plate, which need not be transparent. In general, "top" and "bottom" may be used to identify opposing support plates of an electrowetting display and do not necessarily refer to a direction referenced to gravity or to a viewing side of the electrowetting display device. In example embodiments, the top support plate is the surface through which pixels of a (reflective) electrowetting display are viewed.

Figure 3:
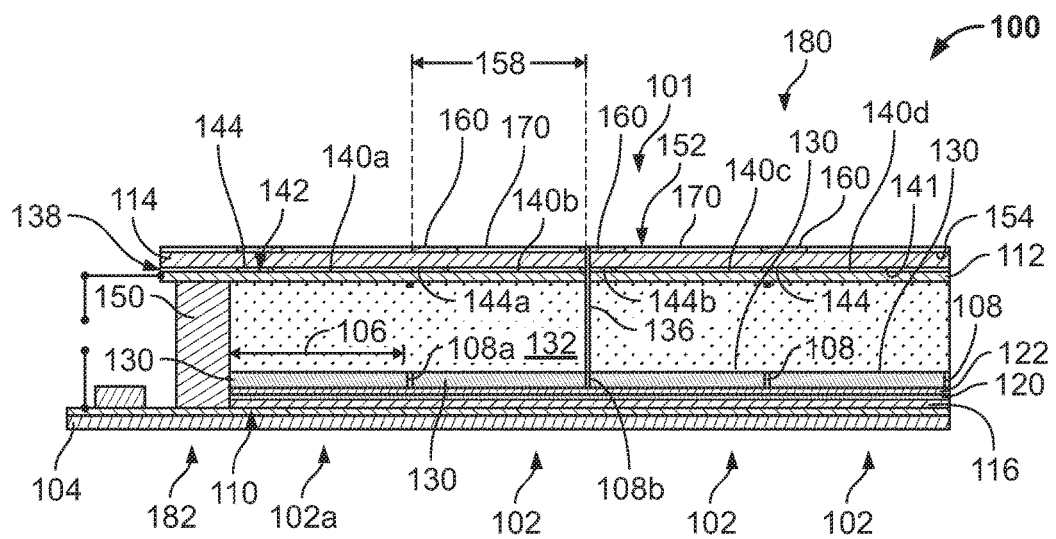
FIG. 3 is a cross-sectional view of a portion of an example electrowetting display device, according to various embodiments.
Figure 4:
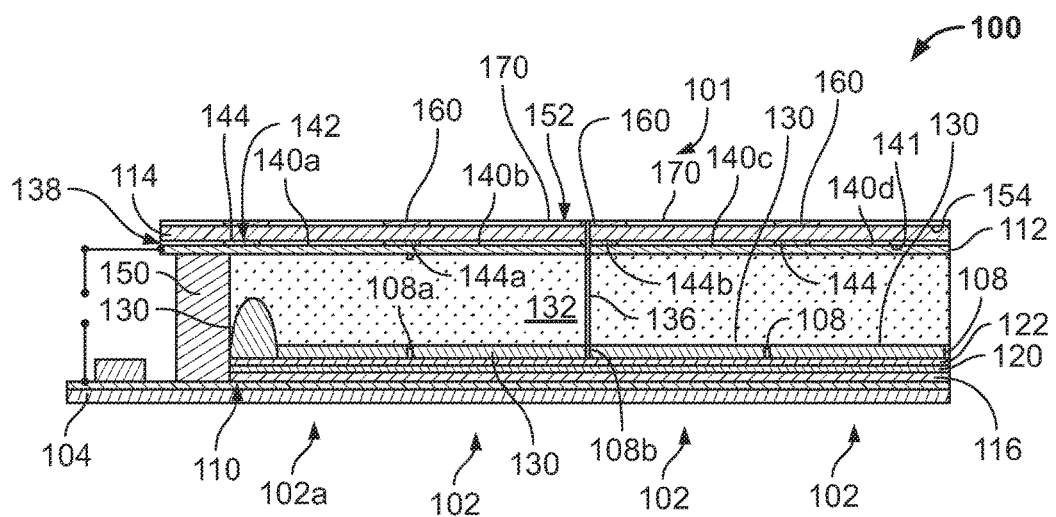
FIG. 4 is a cross-sectional view of the electrowetting display device of FIG. 3 with a first pixel activated, according to various embodiments.

As described above, individual reflective electrowetting pixel regions may include an electrode layer or gate electrode layer containing or coupled to the drive electronics like thin film transistor (TFT) structures, source lines, and gate lines on the bottom support plate, a reflective layer over the electrode layer, a pixel electrode adjacent to the reflective layer, a barrier layer on the reflective layer, and a hydrophobic layer on the barrier layer. In certain embodiments, the reflective layer can act as the pixel electrode. The pixel electrode in principle is close to the liquids in the pixel region to minimize power consumption. In one alternative embodiment, a patterned layer of indium tin oxide (ITO) is deposited as the pixel electrode over or under the reflective layer. In another alternative embodiment, the pixel electrode is under the reflective layer. The electrode layer as shown in FIGS. 3 and 4, for example, can be an electrode layer containing at least part of the drive electronics if the reflective layer is used as the electrode or the electrode layer can contain the pixel electrodes in contact with the reflective layer. Pixel walls of each pixel, the hydrophobic layer, and the transparent top support plate at least partially enclose a liquid region within the cavity that contains the first liquid which is electrically non-conductive, e.g., an opaque oil retained in the individual electrowetting pixels by pixel walls, and the second liquid, e.g., an electrolyte solution, that is electrically conductive or polar and may be a water or a salt solution, such as a solution of potassium chloride in water. The second liquid may be transparent, but may be colored, or light-absorbing. The second liquid is immiscible with the first liquid. In general, substances are "immiscible" with one another if the substances do not substantially form a solution, although in a particular embodiment the second liquid might not be perfectly immiscible with the first liquid. In general, an "opaque" liquid is a liquid that appears black to an observer. For example, an opaque liquid strongly absorbs a broad spectrum of wavelengths (e.g., including those of red, green and blue light) in the visible region of electromagnetic radiation appearing black. However, in certain embodiments an opaque liquid may absorb a relatively narrower spectrum of wavelengths in the visible region of electromagnetic radiation and may not appear perfectly black.

In some embodiments, the opaque liquid is a nonpolar electrowetting oil. In certain embodiments, the first liquid may absorb at least a portion of the visible light spectrum. The first liquid may be transmissive for a portion of the visible light spectrum, forming a color filter. For this purpose, the first liquid may be colored by addition of pigment particles or a dye. Alternatively, the first liquid may be black, for example by absorbing substantially all portions of the visible light spectrum, or reflecting. A reflective first liquid may reflect the entire visible light spectrum, making the layer appear white, or a portion of the entire visible light spectrum, making the layer have a color. In example embodiments, the first liquid is black and, therefore, absorbs substantially all portions of an optical light spectrum.

Spacers and edge seals mechanically couple the first support plate with the overlying, opposing second support plate, forming a separation between the first support plate and the second support plate, and contributing to the mechanical integrity of the electrowetting display device. Spacers can be at least partially transparent so as to not hinder throughput of light in the electrowetting display. The transparency of spacers may at least partially depend on the refractive index of the spacer material, which can be similar to or the same as the refractive indices of surrounding media. Spacers may also be chemically inert to surrounding media. Edge seals, for example, disposed along a periphery of an array of electrowetting pixels, may contribute to retaining liquids (e.g., the first liquid and the second liquid) between the first support plate and the overlying second support plate.

In some embodiments, the electrowetting display device as described herein may be incorporated into a system that includes one or more processors and one or more computer memories, which may reside on a control board, for example. Display software may be stored on the one or more memories and may be operable with the one or more processors to modulate light that is received from an outside source (e.g., ambient room light) or out-coupled from a lightguide of the electrowetting display device. For example, display software may include code executable by a processor to modulate optical properties of individual pixels of the electrowetting display device based at least in part on electronic signals representative of static image and/or video data. The code may cause the processor to modulate the optical properties of pixels by controlling electrical signals (e.g., voltages, currents, and fields) on, over, and/or in layers of the electrowetting display device.

Figure 5:
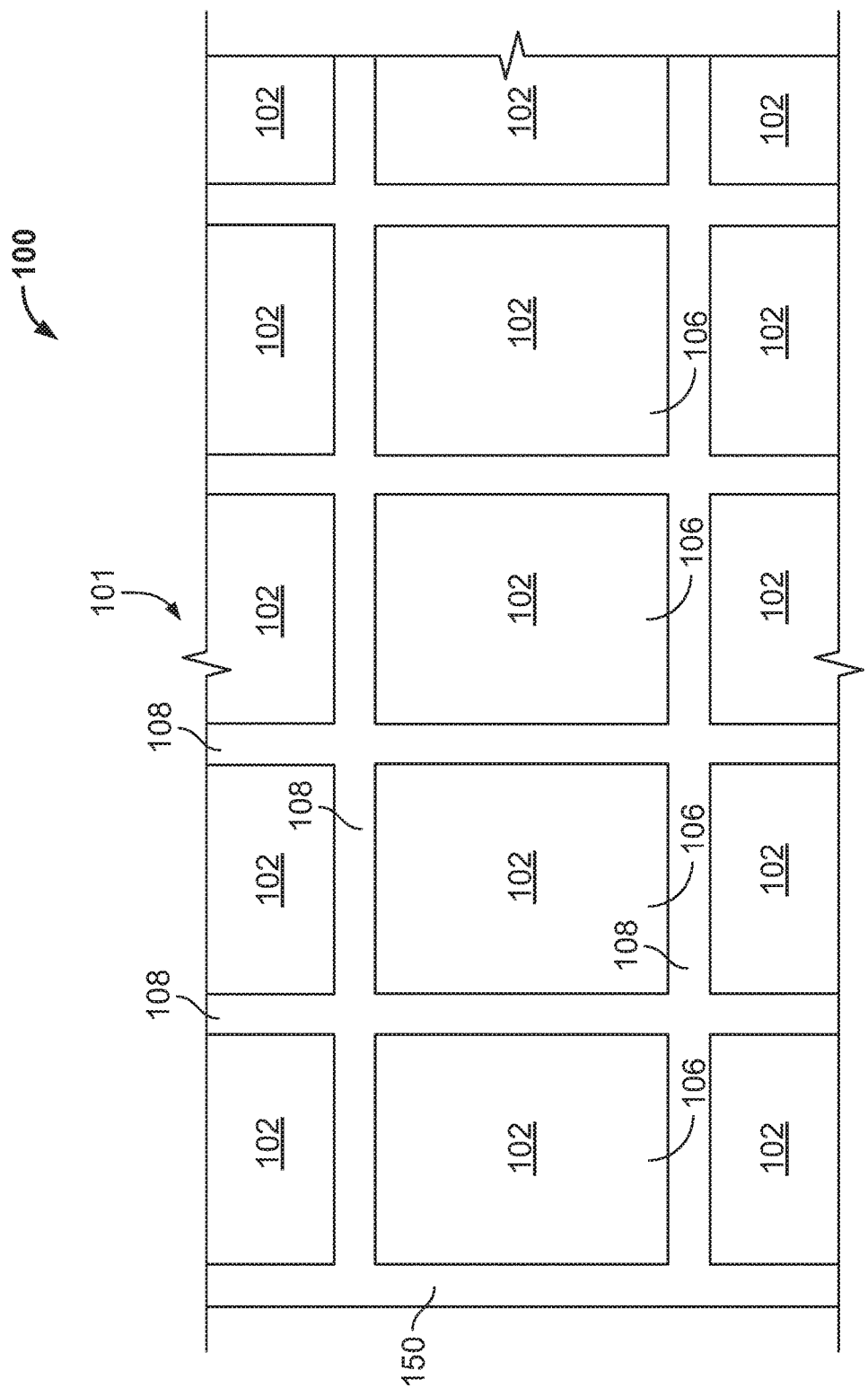
FIG. 5 is a top view of a plurality of electrowetting pixels of an example electrowetting display device, according to various embodiments.

Referring now to FIGS. 3-5, FIG. 3 is a cross-sectional view of a portion of an example reflective electrowetting display device 100 including a pixel grid 101 with several electrowetting pixel regions including a corresponding pixel 102. FIG. 4 shows the same cross-sectional view as FIG. 3 in which an electric potential has been applied to one electrowetting pixel 102a causing displacement of a first liquid disposed in electrowetting pixel 102a, as described below. Four complete electrowetting pixel regions including a corresponding electrowetting pixel 102 are shown in cross-section in FIGS. 3 and 4. FIG. 5 is a top view of an example reflective electrowetting display device 100 including pixel grid 101 having a plurality of electrowetting pixels 102 formed over a first or bottom support plate 104 (shown in FIGS. 3 and 4). As shown in FIGS. 3 and 5, each electrowetting pixel 102 defines a display surface area 106. More specifically, in this embodiment, display surface area 106 is defined by a plurality of pixel wall portions 108, as described below, having a first dimension, such as a width, between opposing lateral pixel wall portions 108, and a second dimension, such as a length, between the remaining opposing pixel wall portions 108. Electrowetting display device 100 may include any number (usually a very large number, such as thousands or millions) of electrowetting pixels 102.

Referring further to FIGS. 3 and 4, an electrode layer 110 having a plurality of pixel electrodes is formed on bottom support plate 104 and between electrowetting pixels 102 and bottom support plate 104. Electrode layer 110 and/or the one or more pixel electrodes are operatively coupled to a second or common electrode 112 positioned under a second or top support plate 114 for creating, in conjunction with common electrode 112, a voltage differential between electrode layer 110 and common electrode 112 to cause displacement of the first liquid, e.g., an oil, within the associated electrowetting pixel 102. These example embodiments are not limiting with respect to the location of the first electrode and the second electrode, and claimed subject matter is not limited in this respect. In particular embodiments, one or more additional layers may be positioned between electrode layer 110 and bottom support plate 104, in which TFT structures, gates, and/or source lines are located, for example. In these embodiments, electrode layer 110 may not be formed directly on bottom support plate 104. In various embodiments, electrode layer 110 may be connected to any number of transistors, such as suitable TFT structures (not shown), that are switched to either select or deselect corresponding electrowetting pixels 102 using active matrix addressing, for example. A TFT structure is a particular type of field-effect transistor that includes thin films of an active semiconductor layer as well as a dielectric layer and metallic contacts over a supporting (but non-conducting) substrate, which may be glass or any suitable transparent or non-transparent material, for example.

A reflective layer 116 is positioned above, e.g., over or on electrode layer 110, as shown in FIGS. 3 and 4, for example. In particular embodiments, one or more additional layers may be positioned between reflective layer 116 and electrode layer 110. In these embodiments, reflective layer 116 may not be formed directly on electrode layer 110. In an alternative embodiment, reflective layer 116 is positioned under a transparent electrode layer. In this alternative embodiment, reflective layer 116 is positioned between the transparent electrode layer 110 and bottom support plate 104. Reflective layer 116 may reflect light within the entire visible spectrum, making the layer appear relatively bright, or reflect a portion of light within the visible spectrum, making the layer have a color. In this embodiment, reflective layer 116 is positioned within the pixel region, e.g., within each electrowetting pixel 102, to provide specular reflection.

In example embodiments, reflective layer 116 is positioned on electrode layer 110 within electrowetting pixel 102 or, alternatively, on electrode layer 110 and under electrowetting pixel 102. In certain embodiments, reflective layer 116 is formed or made of any suitable materials including, for example, a metal (90%, 95% or greater than 95% metal), an alloy, a doped metal, or a dielectric reflector material. Suitable metal materials for reflective layer 116 include, without limitation, aluminum, silver, gold, copper, nickel, platinum, rhodium, lanthanum, and/or silicon nickel. Suitable alloy materials for reflective layer 116 include, without limitation, aluminum with copper or aluminum with nickel. In further alternative embodiments, reflective layer 116 is made of any suitable material providing a desired specular reflectance. In alternative embodiments, reflective layer includes a suitable diffuse reflective material deposited on or over electrode layer 110. In this alternative embodiment, any suitable diffuse reflective material, such as titanium dioxide ($TiO_2$), providing a desired diffuse reflectance may be used.

Electrowetting pixels 102 may have specific and/or additional structural features. Additionally or alternatively, reflective layer 116 may have structural features, for example, one or more relatively thinner areas and/or one or more relatively thicker areas within reflective layer 116 to control movement of the fluids. Alternatively, reflective layer 116 may be deposited on a structural feature conforming to a shape of the structural feature.

A suitable dielectric barrier layer 120 may at least partially separate electrode layer 110 from a hydrophobic layer 122, such as an amorphous fluoropolymer layer forming a bottom surface of electrowetting pixel 102 in certain embodiments. For example, dielectric barrier layer 120 may be deposited on reflective layer 116. Dielectric barrier layer 120 may be formed from various materials including one or more organic material layers or a combination of organic and inorganic material layers. A thickness of the insulating dielectric barrier layer 120 may be less than 2 micrometers and may be less than 1 micrometer; for example, the insulating dielectric barrier layer 120 may be 100 nanometers to 800 nanometers in thickness in certain embodiments. In some embodiments, hydrophobic layer 122 is an amorphous fluoropolymer layer including any suitable fluoropolymer(s), such as AF1600® fluoropolymer produced by DuPont based in Wilmington, Del. Hydrophobic layer 122 is transparent in the example embodiment. As described above, in certain embodiments, reflective layer 116 can act both as a pixel electrode and a reflective layer.

In the example embodiment, one or more pixel wall portions 108 form patterned electrowetting pixel grid 101 on hydrophobic layer 122. Pixel wall portions 108 may include a photoresist material such as, for example, an epoxy-based negative photoresist material SU-8. Patterned electrowetting pixel grid 101 includes a plurality of rows and a plurality of columns that form an array of electrowetting pixels, such as shown in FIG. 5, including a plurality of electrowetting pixels 102 that may have a width and a length in a range of about 50 to 500 micrometers, for example.

A first liquid 130, which may have a thickness (e.g., a height as shown in FIGS. 3 and 4 for example) in a range of about 1 micrometer to 10 micrometers, for example, overlays hydrophobic layer 122. First liquid 130 is partitioned by pixel wall portions 108 of patterned electrowetting pixel grid 101. A second liquid 132, such as an electrolyte solution, overlays first liquid 130 and, in certain embodiments, at least a portion of pixel wall portions 108 of patterned electrowetting pixel grid 101. In certain embodiments, as described above, second liquid 132 may be electrically conductive and/or polar. For example, second liquid 132 may be water or a water solution, or a salt solution such as a solution of potassium chloride in water or a mixture of water and ethyl alcohol. In certain embodiments, second liquid 132 is transparent, but may be colored or absorbing. First liquid 130 is electrically non-conductive and may, for example, be an alkane-like hexadecane or (silicone) oil. As described above, second liquid 132 is immiscible with first liquid 130.

In example embodiments, hydrophobic layer 122 is arranged over bottom support plate 104 to create display surface area 106. The hydrophobic character of hydrophobic layer 122 causes first liquid 130 to adjoin preferentially to hydrophobic layer 122 because first liquid 130 has a higher wettability with respect to a top surface of hydrophobic layer 122 than second liquid 132 in the absence of a voltage. Wettability relates to the relative affinity of a fluid, e.g., a liquid, for the surface of a solid. Wettability increases with increasing affinity, and it may be measured by the contact angle formed between the fluid and the solid and measured internal to the fluid of interest. For example, such a contact angle may increase from relative non-wettability for a contact angle of more than 90° to complete wettability for a contact angle of 0°, in which case the liquid tends to form a film on the surface of the solid.

Top support plate 114 covers second liquid 132 and one or more spacers 136 to maintain second liquid 132 over electrowetting pixel grid 101. In one embodiment, spacers 136 are positioned between top support plate 114 and a respective pixel wall portion 108. In example embodiments, spacer 136 is coupled to and extends from top support plate 114 to contact a contact surface on a first or distal end of one or more pixel wall portions 108, as described in greater detail below. In certain embodiments, one or more components or layers may be positioned between top support plate 114 and spacers 136. In this arrangement, a contact surface of spacer 136 contacts a contact surface of corresponding pixel wall portion 108 to provide a stable contact joint at an interface between pixel wall portion 108 and spacer 136, providing mechanical strength at the interface that is less sensitive to overflow and/or leakage of first liquid 130 and/or second liquid 132 contained within the pixel regions. In alternative embodiments, spacer 136 does not rest on pixel wall portion 108 but is substantially aligned with pixel wall portion 108. This arrangement may allow spacer 136 to come into contact with pixel wall portion 108 upon a sufficient pressure or force being applied to top support plate 114. Multiple spacers 136 may be interspersed throughout electrowetting pixel grid 101.

In example embodiments, one or more filter layers 138 including, for example, color filter portions 140a-140d as shown in FIGS. 3 and 4, may be positioned between second electrode 112 and top support plate 114. For example, one filter layer 138 is disposed, e.g., formed or deposited, on an inner surface 141 of second support plate 114 using a suitable method. Filter layer 138 includes a plurality of color filter portions, collectively referred to as color filter portions 140. In example embodiments, filter layer 138 includes a red color filter portion, a green color filter portion, a blue color filter portion, and a transparent (white) color filter portion positioned between second electrode 112 and top support plate 114. Exemplary color filter portion 140 is indicated as a red color filter portion in FIGS. 3 and 4; however, color filter portion 140 may be a green color filter portion, a blue color filter portion, or transparent (white) color filter portion. Each color filter portion 140 is positioned over or within a respective pixel region and over, e.g., aligned with, a respective electrowetting pixel 102 within the respective pixel region. Each color filter portion 140 may be configured to be substantially transparent to particular ranges of wavelengths of light, while absorbing others. For example, a red color filter portion may be transparent to red light having wavelengths ranging from 620 nanometers (nm) to 750 nm, while absorbing light having other wavelengths. A green color filter portion may be transparent to green light having wavelengths ranging from 495 nm to 570 nm, while absorbing light having other wavelengths. A blue color filter portion may be transparent to blue light having wavelengths ranging from 450 nm to 495 nm, while absorbing light having other wavelengths. A transparent (white) color filter portion may be transparent to all wavelengths of visible light, namely white light. As used herein, visible light refers to wavelengths of electromagnetic radiation visible to the human eye. Generally, this includes electromagnetic radiation having wavelengths between about 400 nm to about 800 nm. Color filter portions 140, therefore, may be utilized to assign each pixel region a color, so that when a particular pixel region is in an open state, light reflected by that pixel region will take on the color of the color filter portion associated with that pixel region. In other embodiments, different ranges of light wavelengths may be associated with the red, green, and blue color filter portions 140.

Each pixel region is associated with a color filter portion 140. Colors filter portions 140 may be constructed with a generally transparent material such as a photoresist material or photo-definable polymer, including electromagnetic radiation filtering materials suspended within the material. Color filter portions 140 may be formed by the addition of pigments or dyes to a clear photo-definable polymer, for example. The amount of additive depends on system requirements, such as absorbance or transmission specifications. In some cases, polyacrylates are used as photoresist material. In one embodiment, electrowetting display device 100 includes a combination of red, blue, green, and white color filter portions 140, with one color filter portion 140 being positioned over each pixel region. Using color filter portions 140, each pixel region in electrowetting display device 100 can be associated with a particular wavelength of electromagnetic radiation. By controlling which pixels region are active within electrowetting display device 100, electrowetting display device 100 can generate color images.

In the example embodiment, filter layer 138 includes a suitable light-absorbing material, such as a black matrix material 142 or another suitable photoresist material including a photosensitive resin and black pigment, for example, disposed on inner surface 141 of top support plate 114. In certain embodiments, black matrix material 142 prevents or limits light leakage between electrowetting pixel regions, for example, to enhance display contrast and/or brightness. For example, one or more light-absorbing members, e.g., black matrix members 144, are positioned around at least a portion of each color filter portion 140 to form a boundary or perimeter around at least a portion of the associated color filter portion 140. In example embodiments, a plurality of black matrix members 144 are positioned over, e.g., aligned over, the plurality of pixel wall portions 108 and form a black matrix grid. For example, a first black matrix member 144a of the plurality of black matrix members 144 is positioned over, e.g., aligned over, a first pixel wall portion 108a of the plurality of pixel wall portions 108. More specifically, black matrix member 144 is positioned along an edge of a first color filter portion, between the first color filter portion and an adjacent second color filter portion.

Color filter portions 140 are adjacent when they are next to one another in the display device with no intervening color filter portion 140 between. Black matrix member 144 is formed between the first color filter portion and the second color filter portion so that black matrix member 144 runs along a boundary between the adjacent color filter portions. In a particular embodiment, black matrix member 144 has a width between the first color filter portion and the second color filter portion of 3.0 micrometers to 10.0 micrometers. In example embodiments, each color filter portion 140a-140d, for example red color filter portion 140b shown in FIGS. 3 and 4, is disposed over or in a respective electrowetting pixel region between black matrix members 144 such that black matrix members 144 form a perimeter of each color filter portion 140a-140d, e.g., red color filter portion 140b. A seal 150 extends about a perimeter of electrowetting display device 100 to contain first liquid 130 and second liquid 132 within the fluid region of the cavity.

In example embodiments, a diffuser 152 is disposed on outer surface 154 of top support plate 114 opposite inner surface 141. In example embodiments, diffuser 152 has a thickness of 50 micrometers to 300 micrometers and, more particularly, a thickness of 60 micrometers to 200 micrometers, although diffuser 152 may have any suitable thickness in alternative embodiments. Diffuser 152 may include one material layer, such as shown in FIGS. 1-4, or a plurality of material layers laminated or otherwise coupled together to form diffuser 152. The one or more material layers forming diffuser 152 may include suitable film materials or other suitable materials. For example, one suitable film material available from Lintec Corporation, Tokyo, Japan, for forming diffuser 152 has a composition including a (meth)acrylic acid ester containing plural aromatic rings, a urethane (meth) acrylate, a photopolymerization initiator, and an ultraviolet absorber. In a particular embodiment, diffuser 152 includes a urethane methacrylate oligomer having a low refractive index, an ethoxylated O-phenylpheno having a high refractive index, and 2-hydroxy-2-methylpropiophrnon as a photopolymerization initiator.

In example embodiments, as described above, diffuser 152 has a periodic, spatially varying diffusion profile. More specifically, diffuser 152 includes a plurality of diffusion areas arranged in an array. Each diffusion area 158 of diffuser 152 is over, e.g., aligned over, a respective pixel region including a corresponding electrowetting pixel 102. Within the array of diffusion areas 158, diffuser 152 exhibits a periodic, e.g., repeating, spatially varying diffusion profile, i.e., each diffusion area 158 exhibits a substantially similar, spatially varying diffusion profile, such that the diffusion profile repeats across a dimension of diffuser 152, e.g., across a length and a width of diffuser 152. For example, diffusion area 158 has a diffusion profile that varies spatially depending on a location within diffusion area 158. In example embodiments, diffusion area 158 has dimensions, e.g., a width and a length, substantially equal to corresponding dimensions, e.g., a width and a length, of the respective pixel region. For example, each of diffusion area 158 and the respective pixel region may have a first dimension, such as a width, and a second dimension perpendicular to the first dimension, such as a height, of 50 micrometers to 200 micrometers. In example embodiments, diffuser 152 has a relatively wide diffusion profile at or near a center location or a center point of diffusion area 158 for providing a wide viewing angle, while at a location or a point at or near a perimeter of diffusion area 158, diffuser 152 has a relatively narrow diffusion profile to steer or direct light away from underlying black matrix members 144 and toward an active region, e.g., reflective layer 116, within the corresponding electrowetting pixel 102. In this embodiment, the diffusion profile at or near the perimeter of diffusion area 158 can generate a light pattern having a high gain and narrow diffusion or a low gain and broad diffusion.

As shown in FIGS. 3 and 4, for example, a plurality of pixel wall portions 108 are positioned over first support plate 104. Pixel wall portions 108 forms a perimeter of the pixel region. A plurality of black matrix members 144 is disposed on inner surface 141 of second support plate 114. Black matrix members 144 are positioned over, e.g., aligned over, corresponding pixel wall portions 108 and form a portion of a black matrix grid. Diffusion area 158 includes a first region 160 positioned over, e.g., aligned over, black matrix members 144 and, in certain embodiments, extending over an active portion of the pixel region, e.g., over a portion of the associated color filter portion. In example embodiments, first region 160 has a suitable first diffusion profile, as described herein, to direct light away from black matrix members 144 and into an active portion, e.g., towards reflective layer 116, of the pixel region.

Figure 6:
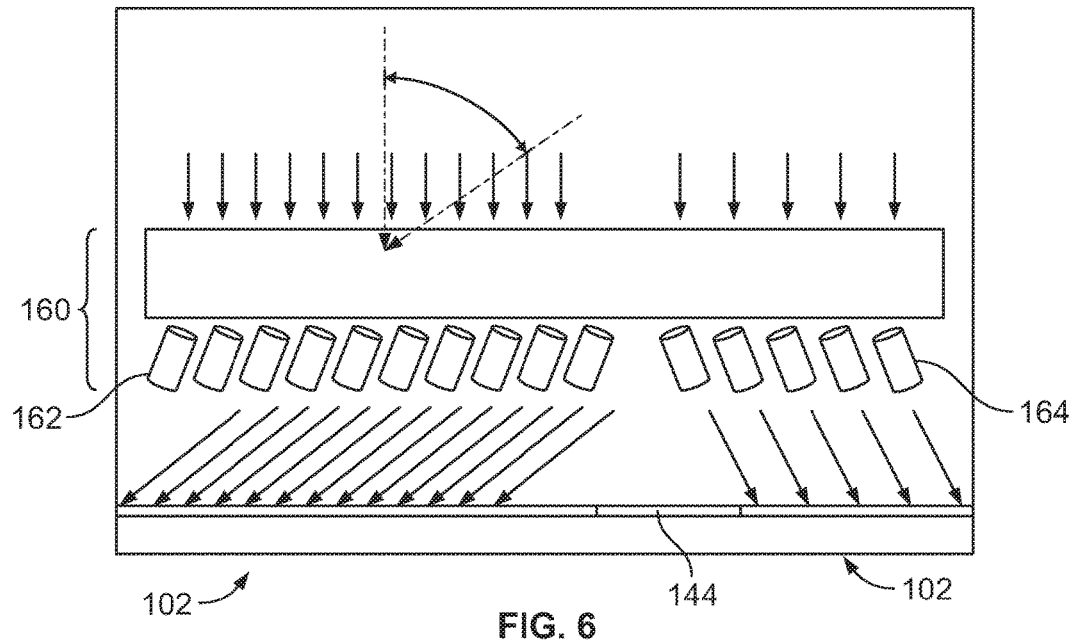
FIG. 6 is a cross-sectional view of a portion of an example electrowetting display device including a first region of an example diffuser, according to various embodiments.

Referring further to FIG. 6, in example embodiments, first region 160 includes a plurality of first microstructures 162, such as grooves, undulations, particles, or columnar structures. In certain embodiments, first microstructures 162 have a relatively higher refractive index than a refractive index of the material of first region 160 surrounding first microstructures 162. Each first microstructure 162 is oriented at a first angle with respect to a surface, e.g., an outer surface, of first region 160 such that a portion of light exits first region 160 through first microstructures 162 with a collimated first diffusion pattern. First microstructures 162 are configured and oriented to direct light away from the underlying black matrix members 144 and into associated electrowetting pixel 102 to impinge on the reflective layer in or under electrowetting pixel 102. While the light exiting first region 160 is depicted as a pattern of collimated light rays in FIG. 6, the light may also be slightly diffused as the light propagates through first microstructures 162 and enters electrowetting pixel 102. The light enters the associated electrowetting pixel region including electrowetting pixel 102 and is not absorbed by black matrix members 144. For example, each first microstructure 162 is oriented at an angle of 10° to 60° and, more particularly, at an angle of 30° to 40° with respect to outer surface 154.

In a particular embodiment, first region 160 also includes a plurality of second microstructures 164 oriented at a second angle with respect to outer surface 154 such that a portion of light exits first region 160 through second microstructures 164 with a collimated second diffusion pattern substantially similar to or different from the collimated first diffusion pattern. Similar to first microstructures 162, in certain embodiments, second microstructures 164 have a relatively higher refractive index than a refractive index of the material of first region 160 surrounding second microstructures 164. In certain embodiments, light enters an additional pixel region including an associated electrowetting pixel 102, adjacent first pixel wall portion 108a, e.g., the pixel region is positioned along a first edge of first pixel wall portion 108a and the additional pixel region is positioned along a second edge of first pixel wall portion 108a opposite and parallel to the first edge.

In a particular embodiment, a second black matrix member 144b of the plurality of black matrix members 144 is positioned over, e.g., aligned over, a second pixel wall portion 108b of the plurality of pixel wall portions 108, as shown in FIGS. 3 and 4. First region 160 is positioned over second black matrix member 144b positioned opposite first black matrix member 144a, i.e., disposed at an opposite side of the respective pixel region. Second black matrix member 144b is positioned over, e.g., aligned over, second pixel wall portion 108b opposite first pixel wall portion 108a. In this embodiment, first region 160 is over second black matrix member 144b such that a portion of light exiting first region 160 enters the respective pixel region.

Referring further to FIG. 6, in example embodiments, the orientation of first microstructures 162 provides that substantially all of incoming light impinging on first region 160 is steered or directed away from normal and into the active portion of the respective pixel region. The orientation or angle of first microstructures 162 can be optimized to steer or direct a maximum amount of light away from black matrix members 144 to ensure display brightness. For example, first microstructures 162 can be oriented at a desired angle in first region 160 by exposing first region 160 to an ultraviolet (UV) irradiation process, wherein incident UV light emitted by a UV light source impinges on first region 160 at a determined collimation angle to orient microstructures 162 at a desired angle with respect to a surface of diffuser 152. As a result of the irradiation process, light rays traveling through first region 160 exit first region 160 at an angle substantially equal to the collimation angle to provide a desired collimated diffusion pattern of light. With the additional light entering the respective pixel region, the display brightness and contrast is enhanced without appreciably negatively affecting the display viewing angle performance. Moreover, because the incident light is steered away from black matrix members 144, the TFT structure of the pixel region positioned under or near black matrix members 144 is protected from undesirable exposure to light.

Figure 7:
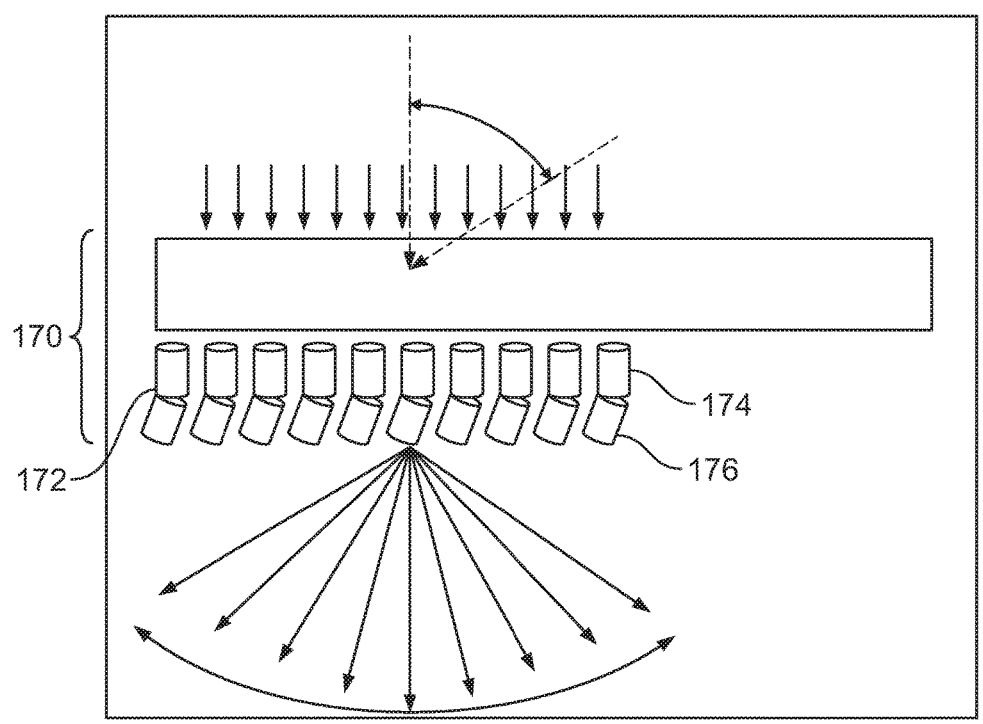
FIG. 7 is a partial cross-sectional view of a portion of an example electrowetting display device including a second region of an example diffuser, according to various embodiments.

Diffusion area 158 also includes a second region 170 disposed between first region portions and positioned over, e.g., aligned over, the respective pixel region, e.g., over at least a portion of a respective color filter portion, such as red color filter portion 140b. More specifically, referring again to FIG. 2, second region 170 is disposed between a plurality of first region portions forming first region 160 such that first region 160 forms a perimeter of second region 170. In example embodiments, second region 170 has a suitable second diffusion profile, as described herein, different from the first diffusion profile of first region 160 to diffuse light in a conical diffusion pattern such that the diffused light enters the respective pixel region. In example embodiments, the conical diffusion pattern of light emitted from second region 170 has a circular pattern in a plane parallel to a surface of diffuser 152. Referring further to FIG. 7, second region 170 includes a plurality of third microstructures 172, e.g., grooves, undulations, particles, or columnar structures. In certain embodiments, third microstructures 172 have a relatively higher refractive index than a refractive index of the material of second region 170 surrounding third microstructures 172. In a particular embodiment, each third microstructure 172 has a bend along a length of third microstructure 172 such that light exiting second region 170 has a suitable conical diffusion pattern, for example. In this particular embodiment, each third microstructure 172 includes a first segment 174 oriented at an angle of 0° to 10° with respect to an outer surface of second region 170 and a second segment 176 oriented at an angle of 10° to 45° with respect to first segment 174 and, more particularly, oriented at an angle of 10° to 30° with respect to first segment 174. In one embodiment, third microstructures 172 can be oriented at a desired angle in second region 170 by exposing at least a portion of second region 170 to a UV irradiation process, wherein incident UV light emitted by a UV light source impinges on second region 170 at a determined collimation angle to form third microstructures 172 orientated at a desired angle with respect to a surface of diffuser 152. As a result of the irradiation process, light rays traveling through second region 170 exit second region 170 in a suitable conical diffusion pattern, for example. As described herein, in certain embodiments, diffuser 152 includes a first material layer, such as a suitable film layer, including first region 160 and a second material layer, e.g., a suitable film layer, coupled to, e.g., laminated to, the first material layer and including a plurality of second regions 170. In certain embodiments having a multi-material layer diffuser 152, each microstructure 172 is oriented at an orientation angle such that light rays traveling through second region 170 exit second region 170 in a conical diffusion pattern having a diffusion angle of at least 70° with respect to an outer surface of diffuser 152 at Full Width-Half Maximum (FWHM). Light diffusion angles can be measured with equipment known in the art, for example, an imaging sphere from Radiant Vision Systems located in Redmond, Wash., U.S.A. Relatively narrower diffusion angles, for example, a diffusion angle of 30° with respect to the outer surface of diffuser 152 at FWHM, can be provided with a single layer diffuser 152. In example embodiments, orientation angles of microstructures within first region 160 or second region 170 with respect to the outer surface of the diffuser having a relatively narrower diffusion angle will be smaller than orientation angles of microstructures within first region 160 or second region 170 with respect to the outer surface of the diffuser having a relatively wider diffusion angle. In certain embodiments, an increase in diffusion angle provides a larger display viewing angle.

Referring further to FIG. 7, in example embodiments, the orientation of third microstructures 172 provides that incoming light impinging on second region 170 is diffused such that the light entering the respective pixel region has a wide diffusion angle. In certain embodiments, the display viewing angle performance is determined by the diffusion profile of second region 170. The orientation or angle of third microstructures 172 can be optimized to provide desired diffusion patterns ranging from narrow angle diffusion patterns to wide angle diffusion patterns depending on the orientation of third microstructures 172 within second region 170. Moreover, the diffusion profiles can be optimized for a specific angle of incidence of incoming light.

Referring again to FIG. 3, reflective electrowetting display device 100 has a viewing side 180 corresponding to top support plate 114 through which an image formed by reflective electrowetting display device 100 may be viewed, and an opposing rear side 182 corresponding to bottom support plate 104. Reflective electrowetting display device 100 may be a segmented display type in which the image is built of segments. The segments may be switched simultaneously or separately. Each segment includes one electrowetting pixel 102 or a number of electrowetting pixels 102 that may be neighboring or distant from one another. Electrowetting pixels 102 included in one segment are switched simultaneously, for example. Electrowetting display device 100 may also be an active matrix driven display type or a passive matrix driven display, for example.

In one example embodiment, an electrowetting display device includes a first support plate and an opposing second support plate and an electrowetting pixel region between the first support plate and the second support plate. A plurality of pixel wall portions formed over the first support plate form a perimeter of the electrowetting pixel region. A filter layer is disposed on an inner surface of the second support plate. The filter layer includes a color filter portion and a plurality of light-absorbing members forming a perimeter of the color filter portion. A first light-absorbing member of the plurality of light-absorbing members is positioned over a first pixel wall portion of the plurality of pixel wall portions. A diffusion layer is disposed on an outer surface of the second support plate opposite the inner surface. The diffusion layer includes a first region over the first light-absorbing member. The first region includes a first plurality of columnar structures. A first columnar structure of the first plurality of columnar structures is oriented at an angle with respect to a surface of the diffusion layer. The first columnar structure is configured to direct a first portion of light exiting the first region away from the first light-absorbing member and into the electrowetting pixel region through the color filter portion. A second region is over at least a portion of the color filter portion. The second region includes a second plurality of columnar structures. A second columnar structure of the second plurality of columnar structures has a bend along a length of the second columnar structure. The second columnar structure is configured to diffuse a second portion of light exiting the second region into the electrowetting pixel region through the color filter portion.

In another example embodiment, a display device includes a first support plate and an opposing second support plate. A pixel region is between the first support plate and an inner surface of the second support plate. A diffuser is disposed on the second support plate. The diffuser has a first diffusion area over the pixel region. The first diffusion area has a first region with a first diffusion profile and a second region with a second diffusion profile. In a particular embodiment, the display device includes a first pixel wall portion over the first support plate. The first pixel wall portion forms a portion of a perimeter of the pixel region. A first member is formed on the second support plate and positioned over the first pixel wall portion. The first region is positioned over the first member and the second region is positioned over an active portion of the pixel region.

In another example embodiment, a diffuser includes a material structure including a diffusion area. The diffusion area includes a first region having a first diffusion profile and forming at least a portion of a perimeter of the diffusion area. A second region is adjacent the first region and has a second diffusion profile different from the first diffusion profile.

Figure 8:
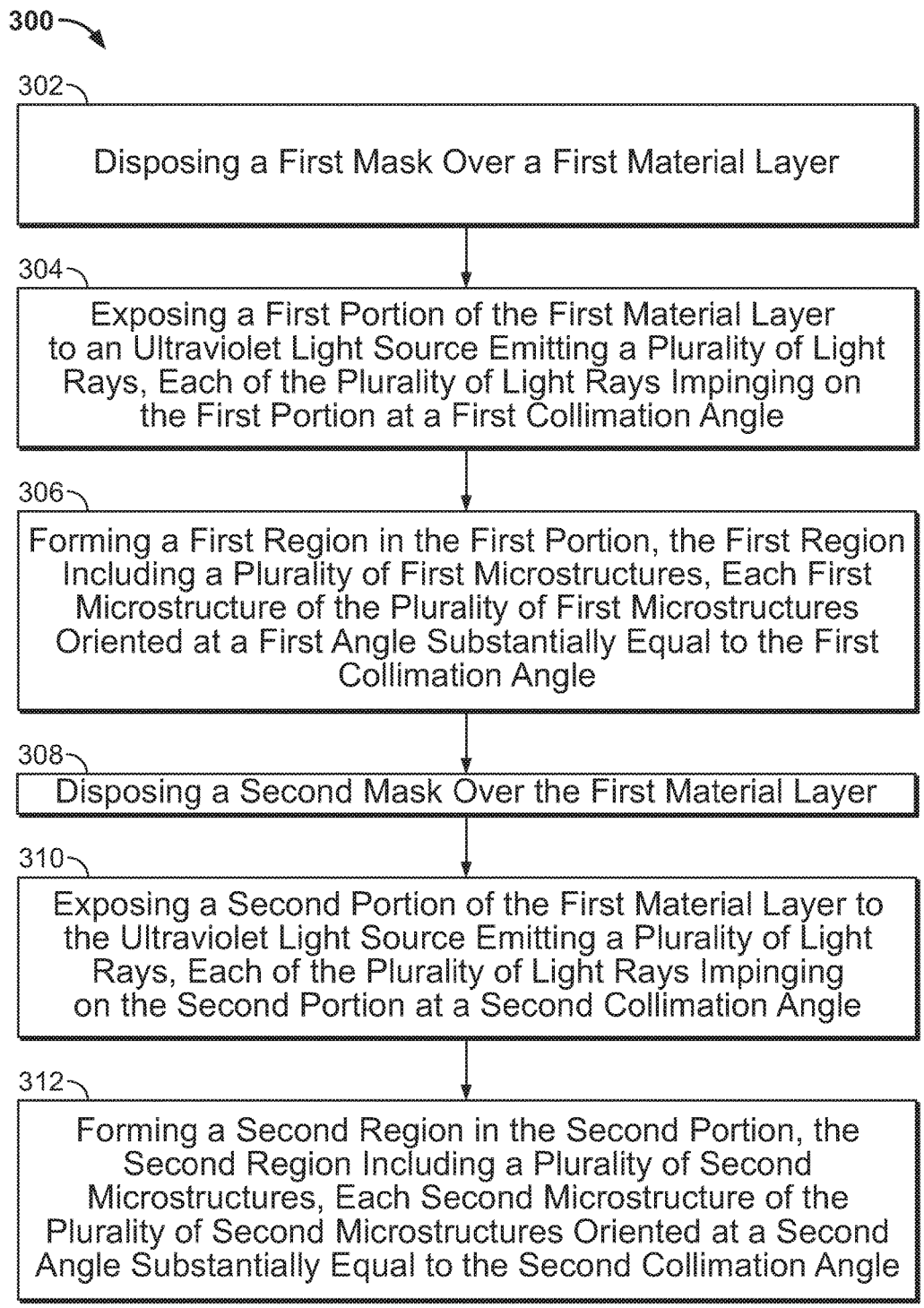
FIG. 8 illustrates an example method for fabricating an example electrowetting display device such as shown in FIGS. 1-7.

FIG. 8 is a flow diagram of an example method 300 for fabricating a diffuser for a display device, such as electrowetting display device 10 or 100 as shown in FIGS. 1-7. At block 302, a first mask is disposed over a first material layer comprising a plurality of areas defined on the first material layer and arranged in an array of areas. In example embodiments, the first mask defines a grid. A first portion of the first material layer is exposed 304 to an ultraviolet (UV) light source emitting ultraviolet light, e.g., a plurality of light rays, at a first collimation angle. The light rays impinge on the first portion at the first collimation angle. A first region is formed 306 in the first portion. The first region includes a plurality of first microstructures. Each first microstructure is oriented at a first angle substantially equal to the first collimation angle. In example embodiments, the first microstructures are oriented with respect to an outer surface of the first material layer at an angle of 10° to 60° and, more particularly, at an angle of 30° to 40°.

At block 308, a second mask is disposed over the first material layer. A second portion of the first material layer is exposed 310 to the ultraviolet light source emitting ultraviolet light, e.g., a plurality of light rays, at a second collimation angle different than the first collimation angle. Each of the light rays impinges on the second portion at a second collimation angle. A second region is formed 312 in the second portion. The second region includes a plurality of second microstructures. Each second microstructure is oriented at a second angle substantially equal to the second collimation angle. In example embodiments, each second microstructure has a bend along a length of the second microstructure such each second microstructure includes a first segment oriented at an angle of 0° to 15° with respect to the outer surface of the first material layer and a second segment oriented at an angle of 10° to 90° with respect to the first segment and, more particularly, oriented at an angle of 20° to 70° with respect to the first segment.

As described herein, in certain embodiments, the diffuser includes a first material layer, such as a suitable film layer, including the first region and a second material layer, e.g., a suitable film layer, coupled to, e.g., laminated to, the first material layer and including a plurality of second regions. In certain embodiments having a multi-material layer diffuser, each second microstructure is oriented at an angle of at least 70° with respect to the outer surface of the second material layer. In this embodiment, the second mask is disposed over a second material layer. A portion of the second material layer is exposed to the ultraviolet light source emitting a plurality of light rays. Each of the plurality of light rays impinges on the first area at the second collimation angle. The second region is formed in the second material layer. The second region includes a plurality of second microstructures, wherein each second microstructure is oriented at a second angle substantially equal to the second collimation angle. The first material layer is then laminated or otherwise coupled to the second material layer to form a diffuser. The diffuser is then disposed on a surface of a support plate of the display device. More specifically, the diffuser is coupled to an outer surface of the top support plate of the display device.

In example embodiments, a method for fabricating a diffuser for a display device includes disposing a first mask over a first material layer. A first portion of the first material layer is exposed to an ultraviolet light source emitting a plurality of light rays. Each of the plurality of light rays impinges on the first portion at a first collimation angle. A first region is formed in the first portion. The first region includes a plurality of first microstructures. Each first microstructure of the plurality of first microstructures is oriented at a first angle substantially equal to the first collimation angle.

In a particular embodiment, a second mask is disposed over the first material layer. A second portion of the first material layer is exposed to the ultraviolet light source emitting a plurality of light rays. Each of the plurality of light rays impinges on the second portion at a second collimation angle. A second region is formed in the second portion. The second region includes a plurality of second microstructures. Each second microstructure of the plurality of second microstructures is oriented at a second angle substantially equal to the second collimation angle.

In another embodiment, a second mask is disposed over a second material layer. A second portion of the second material layer is exposed to the ultraviolet light source emitting a plurality of light rays. Each of the plurality of light rays impinges on the second portion at a second collimation angle. A second region is formed in the second material layer. The second region includes a plurality of second microstructures. Each second microstructure of the plurality of second microstructures is oriented at a second angle substantially equal to the second collimation angle. The first material layer is laminated to the second material layer to form a diffuser.

Figure 9:
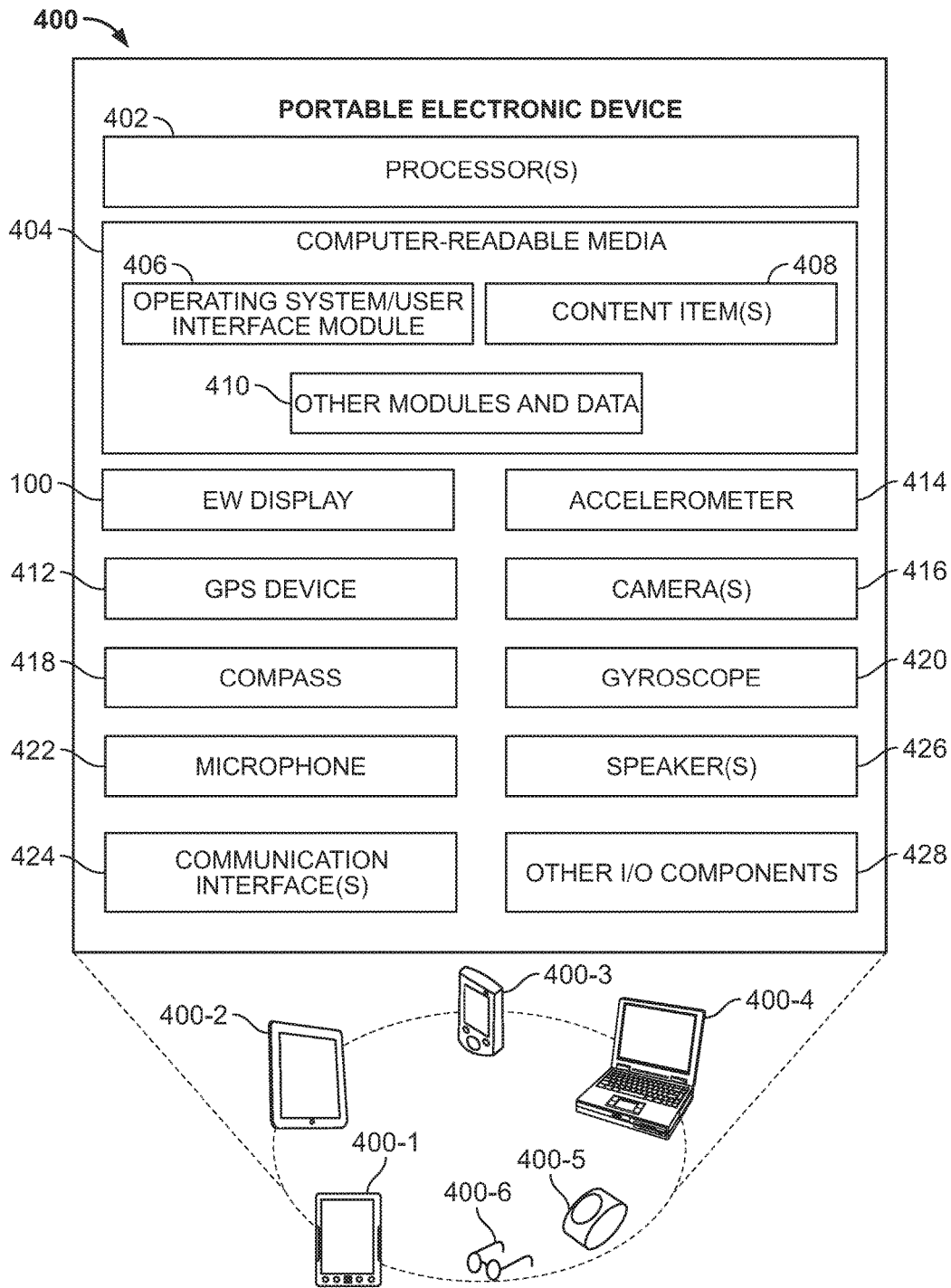
FIG. 9 illustrates an example electronic device that may incorporate an electrowetting display device, according to various embodiments.

FIG. 9 illustrates select example components of an example image display apparatus 400 that may be used with electrowetting display device 100 according to some implementations. Other types of displays may also be used with the example image display apparatus 400. Such types of displays include, but are not limited to, LCDs, cholesteric displays, electrophoretic displays, electrofluidic pixel displays, photonic ink displays, and the like.

Image display apparatus 400 may be implemented as any of a number of different types of electronic devices. Some examples of image display apparatus 400 may include digital media devices and eBook readers 400-1; tablet computing devices 400-2; smart phones, mobile devices and portable gaming systems 400-3; laptop and netbook computing devices 400-4; wearable computing devices 400-5; augmented reality devices, helmets, goggles or glasses 400-6; and any other device capable of connecting with electrowetting display device 100 and including a processor and memory for controlling the display according to the techniques described herein.

In a very basic configuration, image display apparatus 400 includes, or accesses, components such as at least one control logic circuit, central processing unit, or processor 402, and one or more computer-readable media 404. Each processor 402 may itself comprise one or more processors or processing cores. For example, processor 402 can be implemented as one or more microprocessors, microcomputers, microcontrollers, digital signal processors, central processing units, state machines, logic circuitries, and/or any devices that manipulate signals based on operational instructions. In some cases, processor 402 may be one or more hardware processors and/or logic circuits of any suitable type specifically programmed or configured to execute the algorithms and processes described herein. Processor 402 can be configured to fetch and execute computer-readable instructions stored in computer-readable media 404 or other computer-readable media. Processor 402 can perform one or more of the functions attributed to timing controller 102, source driver 104, and/or gate driver 106 of electrowetting display device 100. Processor 402 can also perform one or more functions attributed to a graphic controller (not illustrated) for the electrowetting display device.

Depending on the configuration of image display apparatus 400, computer-readable media 404 may be an example of tangible non-transitory computer storage media and may include volatile and nonvolatile memory and/or removable and non-removable media implemented in any type of technology for storage of information such as computer-readable instructions, data structures, program modules or other data. Computer-readable media 404 may include, but is not limited to, RAM, ROM, EEPROM, flash memory or other computer readable media technology, CD-ROM, digital versatile disks (DVD) or other optical storage, magnetic cassettes, magnetic tape, solid-state storage and/or magnetic disk storage. Further, in some cases, image display apparatus 400 may access external storage, such as RAID storage systems, storage arrays, network attached storage, storage area networks, cloud storage, or any other medium that can be used to store information and that can be accessed by processor 402 directly or through another computing device or network. Accordingly, computer-readable media 404 may be computer storage media able to store instructions, modules or components that may be executed by processor 402.

Computer-readable media 404 may be used to store and maintain any number of functional components that are executable by processor 402. In some implementations, these functional components comprise instructions or programs that are executable by processor 402 and that, when executed, implement operational logic for performing the actions attributed above to image display apparatus 400. Functional components of image display apparatus 400 stored in computer-readable media 404 may include the operating system and user interface module 406 for controlling and managing various functions of image display apparatus 400, and for generating one or more user interfaces on electrowetting display device 100 of image display apparatus 400.

In addition, computer-readable media 404 may also store data, data structures and the like, that are used by the functional components. For example, data stored by computer-readable media 404 may include user information and, optionally, one or more content items 408. Depending on the type of image display apparatus 400, computer-readable media 404 may also optionally include other functional components and data, such as other modules and data 410, which may include programs, drivers and so forth, and the data used by the functional components. Further, image display apparatus 400 may include many other logical, programmatic and physical components, of which those described are merely examples that are related to the discussion herein. Further, while the figures illustrate the functional components and data of image display apparatus 400 as being present on image display apparatus 400 and executed by processor 402 on image display apparatus 400, it is to be appreciated that these components and/or data may be distributed across different computing devices and locations in any manner.

FIG. 9 further illustrates examples of other components that may be included in image display apparatus 400. Such examples include various types of sensors, which may include a GPS device 412, an accelerometer 414, one or more cameras 416, a compass 418, a gyroscope 420, a microphone 422, and so forth.

Image display apparatus 400 may further include one or more communication interfaces 424, which may support both wired and wireless connection to various networks, such as cellular networks, radio, Wi-Fi networks, close-range wireless connections, near-field connections, infrared signals, local area networks, wide area networks, the Internet, and so forth. Communication interfaces 424 may further allow a user to access storage on or through another device, such as a remote computing device, a network attached storage device, cloud storage, or the like.

Image display apparatus 400 may further be equipped with one or more speakers 426 and various other input/output (I/O) components 428. Such I/O components 428 may include a touchscreen and various user controls (e.g., buttons, a joystick, a keyboard, a keypad, etc.), a haptic or tactile output device, connection ports, physical condition sensors, and so forth. For example, operating system 406 of image display apparatus 400 may include suitable drivers configured to accept input from a keypad, keyboard, or other user controls and devices included as I/O components 428. Additionally, image display apparatus 400 may include various other components that are not shown, examples of which include removable storage, a power source, such as a battery and power control unit, a PC Card component, and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:
1. A display device, comprising:
a first support plate and an opposing second support plate;
a pixel region between the first support plate and an inner surface of the second support plate; and a diffuser disposed on the second support plate, the diffuser having a first diffusion area over the pixel region, the first diffusion area having a first region with a first diffusion profile and a second region with a second diffusion profile, the second region comprising a microstructure oriented at an angle with respect to a surface of the second region, the microstructure configured to diffuse light exiting the second region.

2. The display device of claim 1, further comprising:
a first pixel wall portion over the first support plate, the first pixel wall portion forming a portion of a perimeter of the pixel region; and
a first member on the second support plate, the first member over the first pixel wall portion,
wherein the first region is positioned over the first member and the second region is positioned over an active portion of the pixel region.

3. The display device of claim 2, wherein the first region is configured to direct light into the pixel region and the second region is configured to diffuse light in a conical diffusion pattern.

4. The display device of claim 1, further comprising:
a pixel wall portion over the first support plate, the pixel wall portion forming at least portion of a perimeter of the pixel region; and
a filter layer disposed on the second support plate, the filter layer comprising a color filter portion disposed in the pixel region and a first member forming at least a portion of a perimeter of the color filter portion, the first member over the first pixel wall portion,
wherein the first region is positioned over the first member, the first region comprising a first microstructure oriented at a first angle with respect to a surface of the first region, the first microstructure configured to direct a first portion of light exiting the first region into the pixel region through the color filter portion in a collimated diffusion pattern.

5. The display device of claim 4, wherein the first region comprises a second microstructure oriented at a second angle with respect to the surface of the first region, the second microstructure configured to direct a second portion of light exiting the first region into an additional pixel region adjacent the first pixel wall portion.

6. The display device of claim 4, wherein a second member is over a second pixel wall portion forming a portion of the perimeter of the pixel region and the first region is over the second member.

7. The display device of claim 1, wherein the first region comprises a microstructure oriented at an angle of 15° to 50° with respect to a surface of the first region, the microstructure of the first region configured to direct a portion of light exiting the first region into the pixel region through the color filter portion in a collimated diffusion pattern.

8. The display device of claim 1, wherein the diffuser comprises a first material layer including the first region and a second material layer coupled to the first material layer, the second material layer comprising the second region.

9. The display device of claim 8, wherein the microstructure of the second region is oriented at an orientation angle with respect to the surface of the second region such that light exits the second region having a diffusion angle of at least 70°.

10. The display device of claim 1, wherein the diffuser has a periodic, spatially varying diffusion profile as described by a periodic function: $f(x, y) = f(x-np_x, y-mp_y)$, with $\{n, m\} \in \mathbb{Z}$, wherein n and m are integers that describe a periodicity of the array of diffusion areas defined by $(p_x, p_y)$, wherein $p_x$ is a spatial location from a reference location on a surface of the diffuser in an x-direction and $p_y$ is a spatial location from the reference location on the surface of the diffuser in a y-direction.

11. A display device, comprising:
a first support plate and an opposing second support plate;
a pixel region between the first support plate and the second support plate;
a plurality of pixel wall portions over the first support plate, the plurality of pixel wall portions forming a perimeter of the pixel region;
a filter layer disposed on an inner surface of the second support plate, the filter layer comprising a color filter portion and a plurality of light-absorbing members forming a perimeter of the color filter portion, a first light-absorbing member of the plurality of light-absorbing members over a first pixel wall portion of the plurality of pixel wall portions; and
a diffusion layer disposed on an outer surface of the second support plate opposite the inner surface, the diffusion layer comprising:
a first region over the first light-absorbing member, the first region comprising a first plurality of columnar structures, a first columnar structure of the first plurality of columnar structures oriented at an angle with respect to a surface of the diffusion layer, the first columnar structure configured to direct a first portion of light exiting the first region away from the first light-absorbing member and into the pixel region through the color filter portion; and
a second region over at least a portion of the color filter portion, the second region comprising a second plurality of columnar structures, a second columnar structure of the second plurality of columnar structures having a bend along a length of the second columnar structure, the second columnar structure configured to diffuse a second portion of light exiting the second region into the pixel region through the color filter portion.

12. The display device of claim 11, wherein a third columnar structure of the first plurality of columnar structures is oriented at an angle with respect to the surface of the diffusion layer, the third columnar structure configured to direct a third portion of light exiting the first region away from the first light-absorbing member and into an additional pixel region adjacent the pixel region.

13. The display device of claim 11, wherein the filter layer comprises a second light-absorbing member of the plurality of light-absorbing members, the second light-absorbing member over a second pixel wall portion of the plurality of pixel wall portions, the first region is over the second light-absorbing member, and a third columnar structure of the first plurality of columnar structures is oriented at an angle with respect to the surface of the diffusion layer, the third columnar structure configured to direct a third portion of light exiting the first region away from the second light-absorbing member and into the pixel region through the color filter portion.

14. A display device, comprising:
a first support plate and an opposing second support plate;
a pixel region between the first support plate and an inner surface of the second support plate; and
a diffuser disposed on the second support plate, the diffuser having a first diffusion area over the pixel region, the first diffusion area having a first region with a first diffusion profile, the first region comprising a first microstructure oriented at an angle with respect to a surface of the first region such that the first microstructure is configured to direct a portion of light exiting the first region into the pixel region in a collimated diffusion pattern, and a second region with a second diffusion profile, the second region comprising a second microstructure oriented at an angle with respect to a surface of the second region, the second microstructure configured to diffuse light exiting the second region.

15. A display device, comprising:
a first support plate and an opposing second support plate;
a pixel region between the first support plate and an inner surface of the second support plate; and
a diffuser disposed on the second support plate, the diffuser having a first diffusion area over the pixel region, the first diffusion area having a first region with a first diffusion profile and a second region with a second diffusion profile, the second region comprising a microstructure having a bend along a length of the microstructure, and the microstructure comprising a first segment oriented at an angle of 0° to 10° with respect to a surface of the second region and a second segment oriented at an angle of 10° to 30° with respect to the first segment.

* * * * *